United States Patent
Frey, Jr.

(10) Patent No.: US 6,427,212 B1
(45) Date of Patent: Jul. 30, 2002

(54) DATA FAULT TOLERANCE SOFTWARE APPARATUS AND METHOD

(75) Inventor: Alexander H. Frey, Jr., Wayzata, MN (US)

(73) Assignee: Tricord Systems, Inc., Plymouth, MN (US)

( * ) Notice: Subject to any disclaimer, the term of this patent is extended or adjusted under 35 U.S.C. 154(b) by 0 days.

(21) Appl. No.: 09/191,943

(22) Filed: Nov. 13, 1998

(51) Int. Cl.$^7$ .............................. H02H 3/05; G06F 12/00
(52) U.S. Cl. ............................................ 714/6; 711/114
(58) Field of Search ........................... 714/6; 711/114, 711/170, 112, 162, 7

(56) References Cited

U.S. PATENT DOCUMENTS

| | | | |
|---|---|---|---|
| 4,722,085 A | 1/1988 | Flora et al. | |
| 4,761,785 A | 8/1988 | Clark et al. | |
| 4,817,035 A | 3/1989 | Timsit | |
| 5,130,992 A | 7/1992 | Frey, Jr. et al. | |
| 5,390,327 A | 2/1995 | Lubbers et al. | |
| 5,522,031 A | 5/1996 | Ellis et al. | |
| 5,524,204 A | 6/1996 | Verdoorn, Jr. | |
| 5,574,882 A | 11/1996 | Menon et al. | |
| 5,615,352 A | 3/1997 | Jacobson et al. | |
| 5,623,595 A | 4/1997 | Bailey | |
| 5,826,001 A | 10/1998 | Lubbers et al. | |
| 5,875,456 A | 2/1999 | Stallmo et al. | |
| 5,875,457 A | 2/1999 | Shilit | |
| 5,933,592 A | 8/1999 | Lubbers et al. | |
| 5,933,834 A | 8/1999 | Aichelen | |
| 5,960,446 A | 9/1999 | Schmuck et al. | |
| 5,999,930 A | 12/1999 | Wolff | |
| 6,000,010 A | 12/1999 | Legg | |
| 6,021,463 A | 2/2000 | Belser | |
| 6,029,168 A | 2/2000 | Frey | |
| 6,032,216 A | 2/2000 | Schmuck et al. | |
| 6,035,373 A | 3/2000 | Iwata | |
| 6,041,423 A | 3/2000 | Tsukerman | |
| 6,058,400 A | 5/2000 | Slaughter | |
| 6,098,119 A | * 8/2000 | Surugucchi et al. | .......... 710/10 |

OTHER PUBLICATIONS

Brochure: *Foundation Suite™ VERITAS Volume Manager and VERITAS File System*, Veritas Software Corporation, 4 pgs.; Copyright 1999.

(List continued on next page.)

*Primary Examiner*—Peter Wong
*Assistant Examiner*—Tim Vo
(74) *Attorney, Agent, or Firm*—Wong, Cabello, Lutsch, Rutherford Brucculeri, P.C.

(57) ABSTRACT

The invention discloses apparatus and process in which data files are distributed across a large scale data processing system to enable protection from the loss of data due to the failure of one or more fault domains. Specifically, the invention provides significant advances in data base management by distributing data across N fault domains using one or more of a multitude of deterministic functions to protect failure.

16 Claims, 4 Drawing Sheets

DATA FILE (OBJECTS)

| NODE 0, FILE 0 | NODE 1, FILE 0 | NODE 2, FILE 0 | NODE 3, FILE 0 |
|---|---|---|---|
| $B_0$ | $B_1$ | $B_2$ | $B_3$ |
| $B_4$ | $B_5$ | $B_6$ | $B_7$ |
| $B_8$ | $B_9$ | $B_{10}$ | $B_{11}$ |
| $B_{12}$ | $B_{13}$ | $B_{14}$ | $B_{15}$ |
| $B_{16}$ | $B_{17}$ | $B_{18}$ | $B_{19}$ |
| $B_{20}$ | $B_{21}$ | $B_{22}$ | $B_{23}$ |
| $B_{24}$ | $B_{25}$ | $B_{26}$ | $B_{27}$ |
| $B_{28}$ | $B_{29}$ | $B_{30}$ | $B_{31}$ |
| $B_{32}$ | $B_{33}$ | $B_{34}$ | $B_{35}$ |
| ... | | | |

PARITY FILE (OBJECTS)

| NODE 0, FILE P0 | NODE 1, FILE P0 | NODE 2, FILE P0 | NODE 3, FILE P0 |
|---|---|---|---|
| $P_{9-11}$ | $P_{6-8}$ | $P_{3-5}$ | $P_{0-2}$ |
| $P_{21-23}$ | $P_{18-20}$ | $P_{15-17}$ | $P_{12-14}$ |
| $P_{33-35}$ | $P_{30-32}$ | $P_{27-29}$ | $P_{24-26}$ |
| ... | | | |

OTHER PUBLICATIONS

The Design of the Postgres Storage System, Michael Stonebreaker, Proceedings of the 23$^{rd}$ VLDB Conference, Brighton, pp. 289–300, 1987.

The Recovery Box: Using Fast Recovery to Provide High Availability in the UNIX Environment, Mary Baker, Mark Sullivan, Proceedings of the Summer 1992 USENIX Technical Conference, San Antonio, Texas; pp. 31–43; Jun. 1992.

Transarc™ Website print–out: *The AFS System In Distributed Computing Environment,* IBM Transarc, Pittsburgh Pennsylvania, 10 pgs., not dated.

Transarc™ Website print–out: *The AFS System In Distributed Computing Environments,* Transarc Corporation, Pittsburgh, Pennsylvania, 8 pgs., May 1996.

Network Applicance, Inc. Website print–out: *The Network Appliance Enterprise Storage Architecture: System and Data Availability,* Michael J. Marchi, Andy Watson, Network Appliance, Inc., 11 pgs., Copyright 2000.

Paper: *The Architecture of the High Performance Storage System (HPSS),* Danny Teaff, Dick Watson, Bob Coyne, 24 pgs., not dated.

Paper: *Scalability and Performance in Modern File Systems,* Philip Trautman, Jim Mostek, 24 pgs., not dated.

* cited by examiner

DATA FILE (OBJECTS)

| NODE 0, FILE 0 | NODE 1, FILE 0 | NODE 2, FILE 0 | NODE 3, FILE 0 |
|---|---|---|---|
| $B_0$ | $B_1$ | $B_2$ | $B_3$ |
| $B_4$ | $B_5$ | $B_6$ | $B_7$ |
| $B_8$ | $B_9$ | $B_{10}$ | $B_{11}$ |
| $B_{12}$ | $B_{13}$ | $B_{14}$ | $B_{15}$ |
| $B_{16}$ | $B_{17}$ | $B_{18}$ | $B_{19}$ |
| $B_{20}$ | $B_{21}$ | $B_{22}$ | $B_{23}$ |
| $B_{24}$ | $B_{25}$ | $B_{26}$ | $B_{27}$ |
| $B_{28}$ | $B_{29}$ | $B_{30}$ | $B_{31}$ |
| $B_{32}$ | $B_{33}$ | $B_{34}$ | $B_{35}$ |
| ... | | | |

PARITY FILE (OBJECTS)

| NODE 0, FILE P0 | NODE 1, FILE P0 | NODE 2, FILE P0 | NODE 3, FILE P0 |
|---|---|---|---|
| $P_{9-11}$ | $P_{6-8}$ | $P_{3-5}$ | $P_{0-2}$ |
| $P_{21-23}$ | $P_{18-20}$ | $P_{15-17}$ | $P_{12-14}$ |
| $P_{33-35}$ | $P_{30-32}$ | $P_{27-29}$ | $P_{24-26}$ |
| ... | | | |

FIGURE 5

DATA FILE (OBJECTS)

| NODE 0, FILE 0 | NODE 1, FILE 0 | NODE 2, FILE 0 | NODE 3, FILE 0 |
|---|---|---|---|
| $B_0$ | $B_1$ | $B_2$ | $B_3$ |
| $B_4$ | $B_5$ | $B_6$ | $B_7$ |
| $B_8$ | $B_9$ | $B_{10}$ | $B_{11}$ |
| $B_{12}$ | $B_{13}$ | $B_{14}$ | $B_{15}$ |
| $B_{16}$ | $B_{17}$ | $B_{18}$ | $B_{19}$ |
| $B_{20}$ | $B_{21}$ | $B_{22}$ | $B_{23}$ |
| $B_{24}$ | $B_{25}$ | $B_{26}$ | $B_{27}$ |
| $B_{28}$ | $B_{29}$ | $B_{30}$ | $B_{31}$ |
| $B_{32}$ | $B_{33}$ | $B_{34}$ | $B_{35}$ |
| ... | | | |

PARITY FILE (OBJECTS)

| NODE 0, FILE 1 | NODE 1, FILE 1 | NODE 2, FILE 1 | NODE 3, FILE 1 |
|---|---|---|---|
| $P_0$ | $P_1$ | $P_2$ | $P_3$ |
| $P_4$ | $P_5$ | $P_6$ | $P_7$ |
| $P_8$ | $P_9$ | $P_{10}$ | $P_{11}$ |
| $P_{12}$ | $P_{13}$ | $P_{14}$ | $P_{15}$ |
| $P_{16}$ | $P_{17}$ | $P_{18}$ | $P_{19}$ |
| $P_{20}$ | $P_{21}$ | $P_{22}$ | $P_{23}$ |
| $P_{24}$ | $P_{25}$ | $P_{26}$ | $P_{27}$ |
| $P_{28}$ | $P_{29}$ | $P_{30}$ | $P_{31}$ |
| $P_{32}$ | $P_{33}$ | $P_{34}$ | $P_{35}$ |
| ... | | | |

FIGURE 6

DATA FAULT TOLERANCE SOFTWARE APPARATUS AND METHOD

TECHNICAL FIELD

The present invention relates generally to data fault tolerance. Specifically, the invention provides a data fault tolerance device and method, constructed after data has been written through the implementation and use of any deterministic method, which accepts blocks of data existing on separate fault domains and spreading redundancy data on blocks existing in another set of separate fault domains.

BACKGROUND OF THE INVENTION

Many large scale data processing systems now employ a multiplicity of independent computer/disk systems, all of which operate in parallel on discrete portions of a problem. An independent computer/disk is called a node of the multiprocessing system. In such systems, it is possible that data files are distributed across the system so as to balance nodal work loads and to protect against significant losses of data should one or more nodes malfunction.

A variety of techniques have been proposed to enable data reconstruction in the event of failure of one or more nodes. For instance, in U.S. Pat. No. 4,722,085 issued to Flora, a relatively large number of independently operating disk devices are coupled to a read/write interface containing error circuitry and organization circuitry. Each data word read into the system has its bits spread across the disk devices so that only one bit of each word is written to a particular physical disk device. This assures that a single bit error will not cause a fault since it is automatically corrected by parity correction in the error circuitry. U.S. Pat. No. 4,817,035 issued to Timsit also describes a similar, bit-oriented, distributed storage across a plurality of disk units.

In U.S. Pat. No. 4,761,785 issued to Clark et al., assigned to the International Business Machine Corporation, another version of distributed storage is described to enable data recovery in the event of a malfunction. The Clark et al system employs the concept of the spreading of data blocks across a plurality of disk drives and exclusive-Or'ing a series of blocks to derive a parity check block. Each disk drive contains the same number of block physical address areas. Disk physical address areas with the same unit address ranges are referred to as "stripes." Each stripe has n-1 blocks of data written across n-1 disk drives and a parity block on another disk drive, which parity block contains parity for the n-1 blocks of the stripe. Since a stripe of blocks is written across a plurality of disk drives, the failure of any one disk drive can be accommodated by employing the parity block and exclusive-Or'ing it with all remaining blocks, to derive the lost data block.

In U.S. Pat. No. 5,130,992 issued to Frey et al, assigned to the International Business Machines Corporation, overcomes limitations in prior art. Specifically, providing a file-based, parity protection structure which is integral to the file structure rather than the physical disk structure, enabling data blocks to be placed anywhere on an array of disk devices, while still retaining file parity protection, and enabling generated parity blocks included within a data file and to be relevant to and only to the data file, upon removal of the file from disks.

While the system described by Frey et al. does effectively provide a data protection method that is not limited by the physical disk structure, it has drawbacks. First, and most importantly, the parity is incorporated into the file requiring all data to be rewritten if the parity protection scheme is changed. In other words, the parity for n-1 blocks is stored in a specific block in the data file. Thus, if the stripe size is changed to m, all of the data in the file must be moved and parity for m-1 blocks is stored in a different block in the data file. Thus, if the stripe size is changed to m, all of the data in the file must be moved and parity recomputed for m-1 blocks written in the next block in the data file. Additionally, as only or'ing of data is described, no method is given for an alternate parity generation method which may provide similar or improved fault protection.

Accordingly, there is a need to overcome the limitations in both operations and structure of the prior art.

SUMMARY OF THE INVENTION

It is an object of this invention to provide for a parallel computing system, a file-based, protection structure which is separate from the file structure rather than integral to the file structure or the physical disk structure.

It is another object of this invention to provide a protection method which enables data blocks to be placed anywhere on an array of disk files, while retaining file protection, but also allowing the protection scheme to change without requiring the data to be rewritten.

It is still another object of this invention to allow the mixing of protection schemes within a single array of disks.

Specifically, the present invention provides a data fault tolerance by using any deterministic method which accepts blocks of data existing on separate fault domains to spread redundancy data on blocks residing in another set of separate fault domains.

Another object of the present invention is to enable change of data redundancy without requiring the protected data to be rewritten. Yet another objective of the present invention is to provide implementation in a manner that is independent of the file system that is being used to store the data. Further, it is the object of the present invention to overcome the need for protected data sets to use the same block size and/or the same deterministic function for data spreading.

It is also the object of the present invention to overcome the prior art limitation that space/room for the redundancy information has to be allocated at the same time as the data is written. The present invention enables space allocation for redundancy information after the selection of the deterministic function and to be changed, if desired at any future time without rewriting the data. Moreover, the present invention enables data dispersion and spread across multiple files, data storage units, controllers, or computer nodes. Yet another object of the invention is the ability to use any deterministic function which meets the redundancy requirements in determining where to write data blocks.

In the preferred embodiment, data redundancy is implemented by any deterministic method which accepts blocks of data which exist on separate fault domains and places the redundancy on any other separate fault domains.

Embodiments of the present invention will now be described by way of example with reference to the accompanying drawings.

BRIEF DESCRIPTION OF THE DRAWINGS

FIG. 5 illustrates parity in a 4 node system with each parity block protecting 3 blocks of data.

FIG. 6 illustrates the same data as in FIG. 5 with RAID 10 (mirroring) parity scheme.

DETAILED DESCRIPTION OF THE INVENTION

Figure 1:
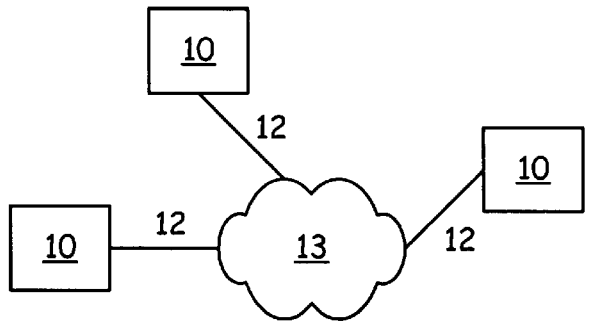
FIG. 1 is a block diagram of a network of communication interconnections of a multi-node, parallel computing system.

Referring to FIG. 1, a block diagram is shown of a parallel computing system and comprises a number of "nodes" 10 interconnected by high speed communication lines.

Figure 2:
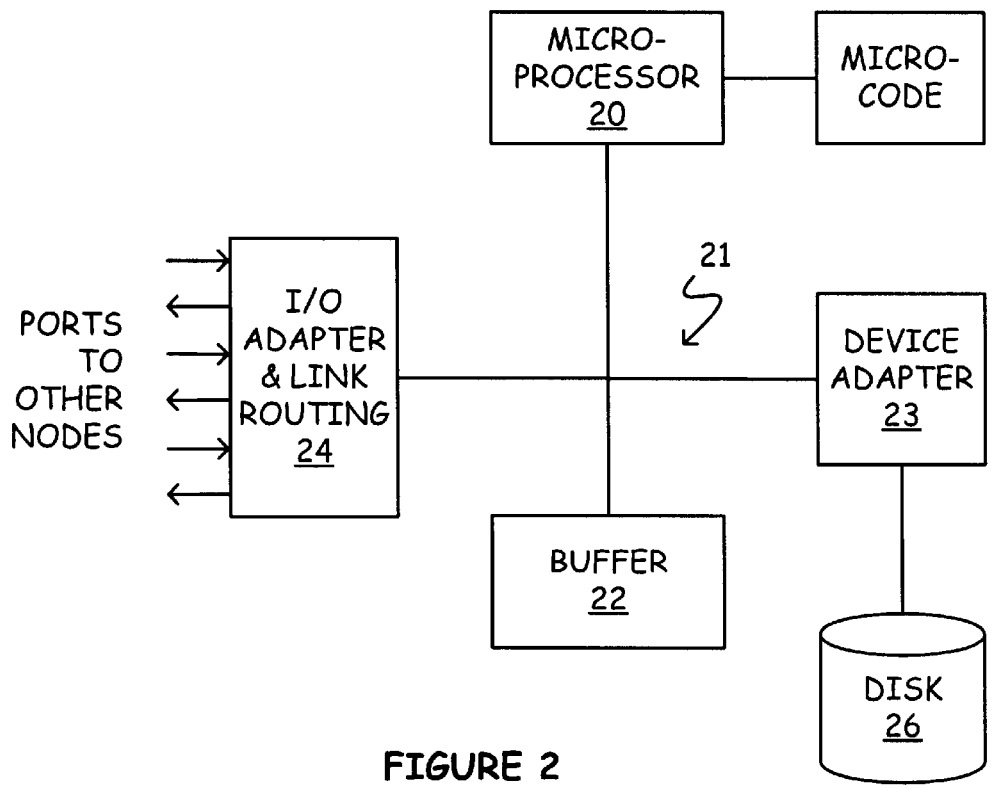
FIG. 2 is a block diagram illustrating the configuration of a node in FIG. 1.

As shown in FIG. 2, each node comprises a microprocessor 20 which is interconnected to other elements of the node via bus structure 21. Buffer memory 22, device adapter 23 and I/O adapter and link router 24 are also connected to bus 21. A disk storage unit 26 is connected to device adapter 23 and is controlled thereby to provide the main mass storage for the node.

The parallel computing system shown in FIGS. 1 and 2 employs software which is organized on a file basis, with each file having one or more data blocks of predetermined length. For instance, an exemplary block size may include 1024 bytes. Each file has a file identifier which uniquely identifies the file. Each block in a file is identified by its position in the file.

From a user's perspective, a file appears as a single, uniform, identical entity from any node irrespective of whether a file comprises a single file block or many file blocks. Each file is accessed through its file identifier, which is a system-wide unique pointer. Through the use of the name of a file, a process can look up the pointer corresponding to the file. This pointer provides access to a table entry that describes the file and indicates the physical location on the disks of the sequential data blocks of the file and a separate file identifier in which parity protection blocks may be located. It should be noted that the length of a file data block and their distribution can be determined by the file creator and does not depend upon the system's configuration or on the existence of an algorithm for parity protection.

In the system shown in FIG. 1, a first block of records in a file is placed in a node that "starts" the file, with the next file data block being placed in the next node, and the placement continues in this manner until the very end. Consecutive blocks are placed on consecutively numbered nodes until the last node of a pre-specified span is reached. The starter node is defined as the node at which record 0 for the file is written. The "span" designates the number of nodes over which the file will be spread. Protection blocks are inserted in a separate file or storage object from the data blocks. It is important to note that the protection block and its method of generation comprise a file parameter which is not determined by the position at which any particular file data block is stored.

The rationale for distributing file data blocks across a plurality of nodes is to assure data recovery in the event of failure of a node. If all file data blocks were stored sequentially in a single node without any protection blocks, the failure of that node would result in the complete loss of the file. By the addition of a protection block for each file data block, the malfunction of any such node can be overcome. By distributing file data blocks across a group of sequentially numbered nodes, a single protection block can protect multiple file data blocks. The maximum number of nodes that can be lost is a function of the chosen protection algorithm and is accomplished by the use of a combination of the protection block(s) and the remaining file data block(s) to regenerate the file data block(s) lost as a result of the malfunction.

Figures 3, 4:
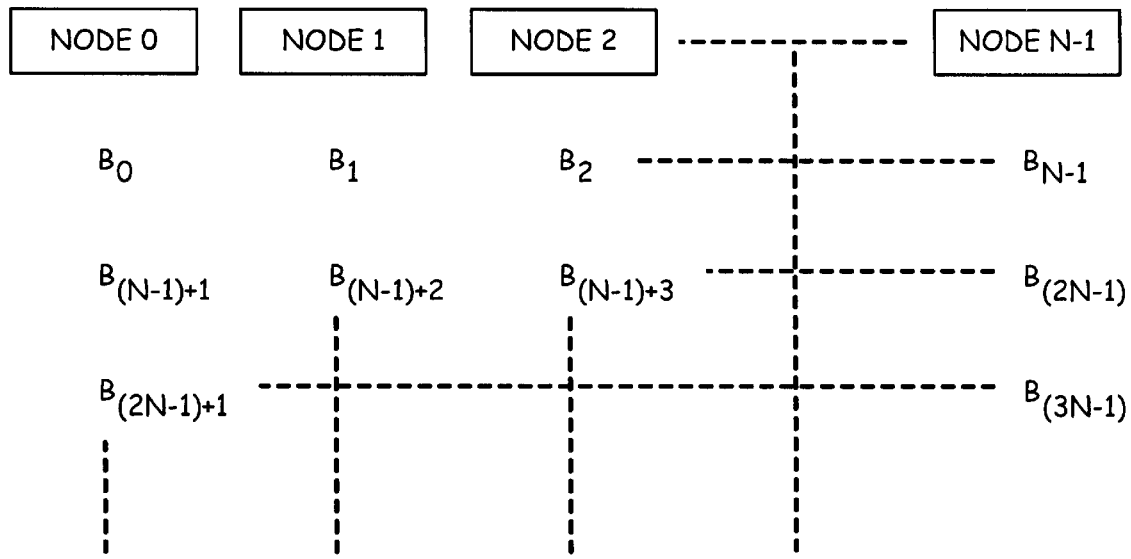
FIG. 3 is a diagram of a plurality of nodes indicating one mode of file data block distribution, each column indicating blocks of data from a single file that are stored on the node indicated at the top of the column.
FIG. 4 is a diagram of an 8 node configuration showing a 5 block parity configuration, wherein parity blocks are segregated from file data blocks.

In FIG. 3, a distributed file data block structure is illustrated, with node 0 being the starting block of a file which includes file data blocks $B_0$-/$B_{3n-1}$. Note that while the file data blocks are shown as being physically placed adjacent each other within each node, the placement of the file data blocks is strictly determined by available storage areas in the particular disk drive in which each file data block is located.

Referring to FIG. 2 again, disk drive 26 preferably includes storage for a file of "meta-data" for each file stored on that drive. That meta data indicates a particular track and physical position within the track at which a particular file data block is located. When the node is operating on a particular file, that file's meta-data will generally be read out and placed in an operating portion of the memory of microprocessor 20, to enable multiple rapid access to requested data. Disk 26 and its associated devices adapter 23 place file data blocks in accordance with a "next available" empty physical storage space in a track and a pointer to it in the file's meta-data. Thus, there is no predetermined positional constraint on the position of any file data block within disk memory 26. Therefore a file data block may be positioned anywhere within disk memory 26 available for file data blocks, so long as its position is noted in the disk drive meta-data for that file.

In the prior art, particularly in the Clark U.S. Pat. No. 4,761,785, successive file data blocks are placed in corresponding disk drive physical storage positions on successive nodes. Parity data blocks derived from the exclusive-OR function performed on corresponding physical, disk drive storage areas are also stored in corresponding physical disk drive storage positions. The Clark et al parity protection scheme is therefore based on physical block storage positions in adjoining disk drives rather than on the file data blocks themselves. As stated hereinabove, this creates a number of problems—especially when moving data files throughout the blocks themselves. As above stated, this creates a number of problems—especially when it came to moving data files throughout the system.

This structure enables the parity blocks to be dispersed throughout the nodes and prevents any single node from being overloaded with parity blocks. It should be noted that each time data is modified in one of the file data blocks, the corresponding parity block needs preferably to be updated. Thus, if all parity blocks were configured in a single or several nodes, those nodes would be greatly overworked and would slow down the effective speed of the system.

FIG. 4 shows the prior art particularly with reference to the Frey U.S. Pat. No. 5,130,992, wherein file data blocks are sequentially arrayed across a series of nodes, with no interspersed nodes for parity blocks. In this case, parity blocks are segregated and placed in specially reserved parity areas in the files being protected. For instance, the parity block $P_{0-2}$ for file data blocks $B_0$-$B_2$ is present on node $N_3$. The parity block $P_{3-5}$ for data blocks $B_3$-$B_5$ is resident on node $N_6$ (in its reserved parity area). This data structure enables sequentially numbered file data blocks to be arrayed across sequentially numbered nodes. It avoids the necessity of concern over where the parity blocks are located when changing the file data block structure.

The data structure described above is file-oriented and is not dependent upon the particular physical position on a disk drive where a file data block is stored. Thus, when a particular file is accessed and moved, it brings with it the associated parity block (or blocks) so that parity is continually retained during the operation of the system. As stated hereinabove this creates a number of problems— especially when changing the scheme used to protect the data, such as by spanning m nodes instead of n nodes.

An exemplary implementation of the present invention, specifically a distributed file structure, is illustrated in FIG. 5 wherein protection blocks (which may be an exclusive-OR or other scheme) are stored in a separate file from the file data. The data distribution (Data File Objects) occurs across 4 nodes with one file, File 0, for data on each node, i.e., "Node 0, File 0", "Node 1, File 0", "Node 2, File 0" and "Node 3, File 0". In this implementation example of FIG. 5, the protection scheme could be an exclusive-OR of data. Using this protection scheme the parity distribution (Parity File Objects) occurs in a separate file, PO from the data files across 4 nodes with one file for parity also spanned across 4 nodes, I.e., "Node 0, File PO", "Node 3, File PO".

Yet another implementation is shown in FIG. 6 which deals with substantially the same data as in FIG. 5 with RAID 10 (mirroring) parity scheme. As is well known in the art, mirroring relates to a fault-tolerance feature that generally sets up primary and secondary partitions on a physical drive. Using an array of disc drives, a computer system can stripe data across the drives as if it were writing to only one drive. Further, the RAID level of the present invention provides an increased level of data protection.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

What is claimed is:

1. A data fault tolerance software system comprising:
   means for organizing data into a data file having at least one data block, wherein each data block is up to a predetermined length;
   means for organizing protection information into a protection file having at least one protection block, wherein each of the at least one data block is associated with one of the at least one protection block, the data file and protection file being different file objects;
   means for identifying each data file and each protection file; and
   means for changing a protection block In the protection file without requiring a rewrite of a data block.

2. The software system of claim 1 wherein said predetermined length is determined by a user and is independent of the system's configuration.

3. The software system of claim 1 wherein said means for organizing said data file includes a starter node means that starts the data file with a next data block being placed in a next node and placement continues in this manner.

4. The software system of claim 1 wherein said at least one protection block includes a parameter which is independent of the position at which any particular data block is stored.

5. The software system of claim 2 wherein said predetermined length is independent of the existence of an algorithm for parity protection.

6. The software system of claim 3 wherein said placement is implemented to structure consecutive data blocks on consecutively numbered nodes until a last node of a pre-specified span is reached.

7. The software system of claim 4 wherein a single one of said protection blocks is implemented to protect multiple data blocks.

8. The software system of claim 6 wherein said span designates the number of nodes over which the data file will be spread.

9. The software system of claim 7 wherein said protection blocks utilize a protection scheme comprising an exclusive-OR of data.

10. A data fault tolerance software system implemented in a microprocessor, wherein the software system utilizes a process to provide data fault tolerance, the microprocessor-implemented process comprising:
    a data spreading process for spreading data into a data file having at least one data block;
    a protection spreading process for spreading redundancy information into a redundancy file having at least one redundancy block, said at least one redundancy block associated with at least one data block; and
    a data redundancy changing process to change a redundancy block without rewriting a data block.

11. A method, comprising:
    storing one or more data blocks in a data file;
    storing one or more parity protection blocks in a parity file, each of said one or more parity protection blocks including parity information in accordance with a first protection scheme and based on the contents of at least one of the one or more data blocks; and
    changing the first protection scheme to a second protection scheme by updating at least one of the one or more parity protection blocks without rewriting the data blocks.

12. The method of claim 11, wherein the act of storing the one or more data blocks comprises storing the one or more data blocks in accordance with an exclusive-OR scheme.

13. The method of claim 11, wherein the act of changing the first protection scheme comprises changing the first protection scheme to a mirroring scheme.

14. The method of claim 11, wherein the act of storing one or more protection blocks comprises storing parity bits in the protection file that are generated based on the one or more data blocks.

15. The method of claim 12, wherein the act of updating comprises substituting a parity protection block in accordance with the second protection scheme for the parity block in accordance with the first protection scheme.

16. The method of claim 14, further comprising changing the parity bits in a protection block in the protection file without rewriting the one or more data blocks.

* * * * *